April 3, 1962 W. H. BENDALL 3,027,774
DRIVE CHAIN
Filed April 27, 1961

INVENTOR.
Wilfid H Bendall

United States Patent Office 3,027,774
Patented Apr. 3, 1962

3,027,774
DRIVE CHAIN
Wilfrid H. Bendall, Stonington, Conn.
Filed Apr. 27, 1961, Ser. No. 105,966
7 Claims. (Cl. 74—249)

This invention relates generally to drive chains for mechanical power transmission purposes and particularly to the type industrially characterized as "detachable chain," and is a modification of the chain construction disclosed in United States Patent No. 2,836,984, issued to the present inventor on June 3, 1958.

Detachable link chains, while well established in practice as evidenced by their continued use for farm implement and light conveyor drives since their origin some eighty years ago, have been largely superseded for the broad range of industrial chain drive requirements by more highly developed and more costly types of chain construction, such as the well known roller and inverted-tooth pivoted link chains. The continued use of detachable chain for the purposes noted, however, and its persistence substantially unchanged in design since its early industrial origin, may well be attributed to certain latent but as yet unrealized potentialities. These undoubtedly reside in the compelling simplicity and inherent economy of its design principle, embodying as it does a unitary chain link structure having integral pivot-bearing, sprocket engagement and interconnecting means, while retaining the advantage of ready detachability at each link member.

As at present manufactured and used the detachable chain is generally acknowledged to have design and performance limitations which drastically limit its mechanical endurance life under stress and thus, its allowable working load and speed, if satisfactory service life is to be realized. Even with close observance of recommended load ratings a relatively short working life is taken for granted and economic performance is largely predicated upon the low initial cost of manufacture, ease of replacement, and the circumstance that for agricultural implement uses, where operation is usually seasonal, a comparatively limited total number of working hours may represent several seasons use.

Nevertheless, in view of the intrinsic merit of the detachable chain it can be logically inferred that any structural revision which would substantially increase its transmission capacity and working life, and thus adapt it to a broader range of industrial drive uses while retaining its unique simplicity of design and low manufacturing cost, would greatly enchance its economic status and would constitute a new and particularly useful contribution to the art of chain driving. This is a specific object of the present invention.

In meeting the increasing industrial requirement for efficient high speed operation, an improved detachable chain must be susceptible of manufacture with greater link pitch precision than appears to be feasible with designs of the prior art. It is accordingly an object of the present invention to provide a detachable chain having link members better adapted to precise manufacture than those of the prior art.

High tensile strength in relation to weight is an important requirement for efficient drive chain operation, since centrifugal force loading and destructive impact with the drive sprocket teeth, which are proportional to the specific weight of the chain, are inherent performance limiting characteristics of all articulated link chains. The conventional detachable chain is particularly deficient in this respect and it is a further object of this invention to provide a detachable chain construction with a substantially higher ratio of strength to weight.

The characteristic "hook and bar" pivot construction of conventional detachable chains, in which the "bar" end of each link member rotates as a journal inside the "hook" end of an interconnected link, does not provide the low friction, cool-running pivot bearing conditions desirable for durable high speed operation of drive chains. It is thus a further object of this invention to provide a detachable chain having link pivot bearings capable of efficient operation without critical dependence on lubrication.

Operation on drive sprockets machined to close dimensional tolerances is essential for efficient drive chain performance. This does not appear to be feasible with conventional detachable chains. It is therefore another object of this invention to provide a detachable chain adapted for efficient operation on such sprockets and further, on sprockets of industrially standardized tooth form which are in wide commercial availability and use for power transmission chains manufactured to high accuracy.

The "hook" portion of conventional detachable chain links engages the drive sprocket teeth with its external surface rotating in contact therewith under load. This condition is mechanically objectionable since it greatly increases drive friction and results in accelerated wear of both chain and sprocket. It is thus another object of this invention to provide a detachable chain having link members which engage the drive sprockets without excessive frictional contact therewith under load.

Drive shock resistance and resilient engagement with the sprockets are important desiderata in chain drives. The established detachable chain, in common with all types of articulated link chains currently in use, is inherently unsatisfactory in this respect. Provision for effective resilience and shock resistance at the tooth engagement points and thus, effective load distribution on the sprocket teeth, is a further object of the detachable chain construction of this invention.

Another object is to provide a detachable chain having a wider operating speed and power range in a given pitch size than can be realized with present chains, so that manufacture in less than half the usual range of link pitch sizes will cover the majority of industrial chain drive requirements.

Further objects are to provide a detachable chain well adapted to fast automatic assembly and to convenient manual detachment of the link members so that installation or replacement of chain strands or individual link members in a given drive can be accomplished without disturbing the sprocket centers or alignment of an installation.

All of the foregoing and other objects and advantages of the detachable chain of this invention are further set forth in the ensuing specification and illustrated in the accompanying drawing in which like numerals designate like parts throughout, and in which FIGURE 1 is a perspective view of a link member of the chain of this invention.

FIGURE 2, on a smaller scale, is a fragmentary side elevational view of a chain assembly embodying link members of the form shown in FIGURE 1.

Figure 1:
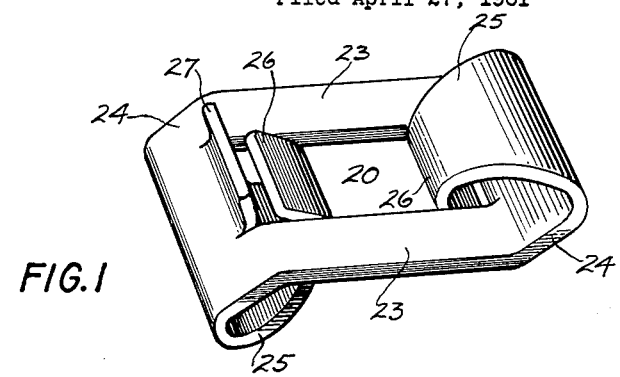

FIG. 1 shows a typical link member of the chain of this invention as constructed of resilient, or spring-tempered, flat sheet material. As illustrated the link member is provided with an aperture 20 transversely centered between equal side portions 23, 23. Opposite end portions 24 at each end of the aperture are bent out of the plane thereof and a further extension of each such bent portion is turned over on itself to form the transversely curved external link pivotal portions 25. These external pivotal portions are given the requisite radius of curvature for engaging the teeth of drive sprockets and, as shown, terminate in a tapered width end portion 26 intersecting the link aperture and positioned to engage an internal pivotal portion of an interconnected link. Fabrication of the link member is then substantially completed by shaping a portion of the material at the transverse edges of the aperture to form the projecting internal pivotal portions 27, at each pivotal end of the link member.

Figure 2:
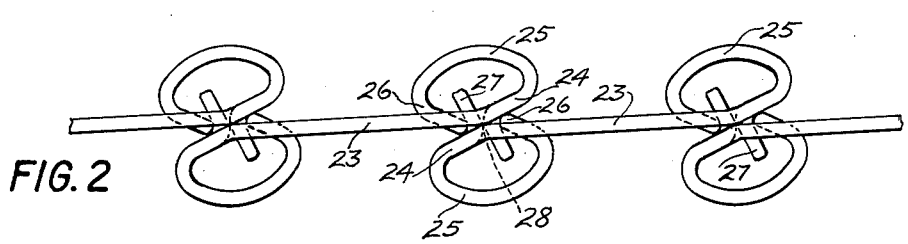
Figure 3:
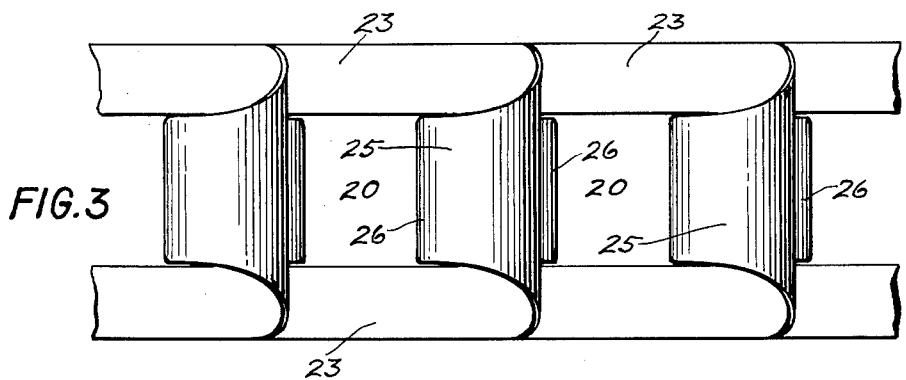
FIGURE 3 is a plan view of the assembled chain in FIGURE 2.

Referring now to FIG. 2, showing the above described link members assembled to form a chain, it will be seen that the members assemble with end portions overlapping each other substantially at the angularly bent link portions 24 and that, assembled thus, each internal piovtal portion 27 intersects an aperture 20 and abuts an identical pivotal portion of an interconnected link. The abutting pivotal portions 27 are thus in externally tangential load transmitting contact with each other substantially at the transverse contact line 28 constituting the pivotal center of each pair of overlapped and interconnected link ends. The tapered end portions 26 are in resiliently sprung guiding and retaining contact with the internal pivotal portions and exert a degree of spring resistance to the link rotation when engaging drive sprocket teeth, thereby serving to reduce impact with the sprocket. It should be noted that both ends of each link member can be formed in the same direction if desired, the primary advantage of forming the ends in opposite directions, as shown, being that in the latter case the total number of links comprising a drive chain can be either odd or even.

The ability to operate on accurately machined drive sprockets is an important economic objective of the chain of the present invention and it is preferably designed to operate on sprockets of the industrially standardized roller chain type, which are in wide commercial availability and use. As is well know, such sprockets have a tooth form adapted to engage standard chain roller diameters corresponding to a given link pitch dimension and have a tooth profile designed to efficiently accommodate progressive link pitch elongation within economic wear limits. The present link members accordingly have central apertures 20 dimensioned to clear the teeth of such sprockets and external link pivotal portions 25 substantially equal in effective diameter to chain rollers of equivalent size. In practice, however, the portions 25 preferably have an external radius of curvature slightly less than the root radius of the sprocket teeth to effect a practical degree of rolling, rather than rubbing, contact with the sprocket during engagement thereon.

Figure 4:
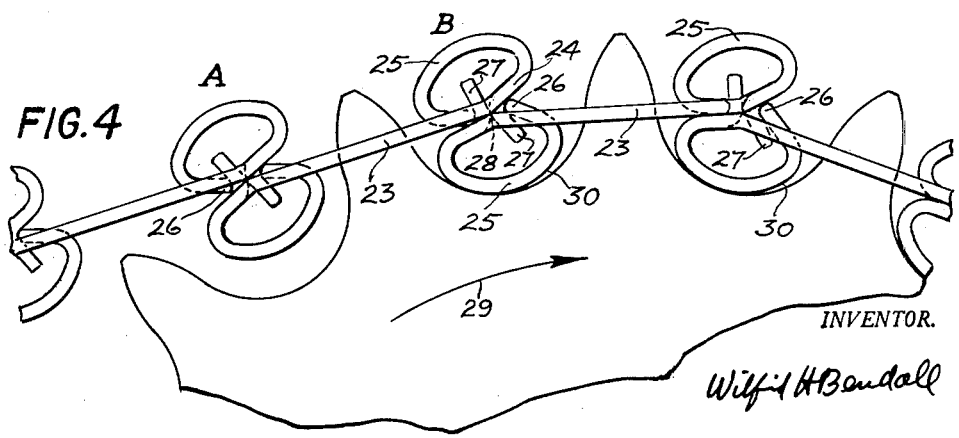
FIGURE 4 is a fragmentary side elevational view showing the chain of this invention engaging a roller chain drive sprocket of industrially standardized tooth form.

These conditions are illustrated in FIG. 4 which shows the chain engaging a drive sprocket having teeth of standard roller chain tooth form. The sprocket is assumed to be rotating in the direction of the arrow 29 and the link member between link pivotal positions designated A and B, is about to pivot at position B into full engagement with the sprocket. It will be noted that the effective diameter of the link pivotal portions 25 is made slightly less than the root diameter of the sprocket tooth space, as recommended above, to provide a working clearance 30 for rolling contact therewith.

It will be observed that the symmetrical design of the assembled link ends permits operation in either direction of rotation, with drive sprockets engaging opposite sides of the chain in the same drive if desired, thus duplicating the useful spatial and directional versatility of the standard roller chain. In furtherance of this objective the maximum transverse width of the link members of this chain is made equal to the indiivdual strand clearance width on standard multiple-width roller chain sprockets. The single width chain disclosed herein can thus be used in separate parallel strands on these sprockets to transmit greater power without having to increase the sprocket diameter or use a heavier chain.

The structural and performance advantages of this chain, as related above, are achieved without detracting from the desirable features of ease of link interconnection and separability inherent in the detachable chain principle. Assembly in the present case is readily accomplished by lightly pressing the link ends normally towards each other until the short internal pivotal portions 27 snap into resilient engagement with the end portions 26. Automatic assembly at high speeds can be accomplished in the same way and it can be noted that the amount of slack required in the drive strand to accomplish removal or replacement of the link members in an installed chain is conveniently small, permitting such manipulation without disturbing the sprocket mountings or drive centers of the installation.

While the link member of the chain of this invention is disclosed as constructed of a single thickness of sheet material, its structure may alternatively comprise two or more layers, or it may be fabricated as a casting. It may likewise have end portions modified to engage sprockets of different tooth form. The link members may also have resilient material bonded thereto for this purpose and to provide various drive characteristics and, as is customary with detachable chains, numerous integral link extensions or attachments can be incorporated in the link structure to extend its use to specific conveyor and similar drive duties where its improved operating characteristics will be of value.

These modifications are cited to emphasize that the detachable chain of the present invention is not limited to the specific embodiment disclosed herein essentially by way of example and that numerous such variations of size, shape and processing of the link members are held to be within the scope of this disclosure and of the appended claims.

I claim:

1. A drive chain comprising pivoted links disposed end to end each having a rectangular aperture and each having an external and an internal pivotal portion at each end thereof, said external pivotal portion comprising an end of the link curved transversely over on itself with a tapered extension thereof intersecting said aperture and said internal pivotal portion comprising an extension of a transverse edge of the aperture thereof shaped to project substantially normal thereto and extend between a like tapered extension and projecting internal pivotal portion of an interconnected link.

2. A drive chain as defined in claim 1, said links being constructed of resilient sheet material and said pivotal portions being adapted for resilient retentive engagement with like pivotal portions of interconnecting links.

3. A drive chain as defined in claim 1, said external pivotal portions being shaped to engage drive sprocket teeth.

4. A drive chain comprising pivoted links of resilient sheet material disposed end to end with overlapping end portions, each link having an aperture and having external and internal pivotal portions at each end thereof, each external pivotal portion comprising a tapered end portion of a link curved over on itself to intersect the aperture and resiliently engage an internal pivotal portion of an interconnecting link, each said internal pivotal portion comprising material at a transverse edge of the aperture shaped to project out of the plane thereof, said links being interconnected by abutting pairs of resiliently interlocked external and internal pivotal portions at each overlapping end.

5. A drive chain as defined in claim 4, said external pivotal portions being shaped to engage drive sprocket teeth.

6. A chain link member constructed of resilient sheet material having a rectangular aperture and having external and internal pivotal portions at each end thereof, each external pivotal portion comprising an end portion curved transversely over on itself and having a tapered extension thereof intersecting said aperture and each internal pivotal portion comprising material at a transverse edge of the aperture shaped to project normal to the plane thereof, said pivotal portions being constructed and arranged to resiliently interlock with like pivotal portions of like link members.

7. An apertured chain link member constructed of resilient material and having oppositely directed external and internal pivotal end portions at opposite ends thereof, each external pivotal end portion curving transversely over its end of the link and intersecting the aperture and each internal pivotal portion comprising material at a transverse edge of the aperture shaped to project normal to the plane thereof and resiliently interlock with like pivotal portions of like link members.

References Cited in the file of this patent

UNITED STATES PATENTS

| | | |
|---|---|---|
| 1,394,979 | Dull | Oct. 25, 1921 |
| 1,555,577 | Horner | Sept. 29, 1925 |
| 2,679,762 | Paulsen | June 1, 1954 |
| 2,836,984 | Bendall | June 3, 1958 |